(12) United States Patent
Allen et al.

(10) Patent No.: US 9,903,217 B2
(45) Date of Patent: Feb. 27, 2018

(54) SEALING ELEMENT

(71) Applicant: ROLLS-ROYCE PLC, London (GB)

(72) Inventors: Jeffrey Allen, Derby (GB); Adrian Wright, Cannock (GB); Anthony Grassby, Sheffield (GB); Barry Lowe, Killaloe (IE); Kevin O'Sullivan, Castletroy (IE); Philip Carroll, Lymm (GB); Philip Gordon Minion, Derby (GB)

(73) Assignee: ROLLS-ROYCE plc, London (GB)

( * ) Notice: Subject to any disclaimer, the term of this patent is extended or adjusted under 35 U.S.C. 154(b) by 174 days.

(21) Appl. No.: 14/852,032

(22) Filed: Sep. 11, 2015

(65) Prior Publication Data

US 2016/0097295 A1 Apr. 7, 2016

(30) Foreign Application Priority Data

Oct. 1, 2014 (GB) .................... 1417307.4

(51) Int. Cl.
*F01D 11/12* (2006.01)
*B23K 26/342* (2014.01)
*F01D 25/12* (2006.01)
*F16J 15/44* (2006.01)

(52) U.S. Cl.
CPC ............ *F01D 11/12* (2013.01); *B23K 26/342* (2015.10); *F01D 11/122* (2013.01); *F01D 11/127* (2013.01); *F01D 25/12* (2013.01); *F16J 15/44* (2013.01); *F05D 2220/32* (2013.01);

(Continued)

(58) Field of Classification Search
CPC ..... B23K 26/342; F01D 11/12; F01D 11/122; F01D 11/127
See application file for complete search history.

(56) References Cited

U.S. PATENT DOCUMENTS

| 4,198,839 A * | 4/1980 | Linko ................... B23P 15/00 228/114 |
| 4,466,772 A * | 8/1984 | Okapuu ................. F01D 11/08 415/171.1 |
| 6,203,021 B1 | 3/2001 | Wolfla et al. |

(Continued)

FOREIGN PATENT DOCUMENTS

| EP | 1 146 204 A2 | 10/2001 |
| EP | 1 452 696 A2 | 9/2004 |

(Continued)

OTHER PUBLICATIONS

Mar. 20, 2015 Search Report issued in British Patent Application No. GB1417307.4.

(Continued)

*Primary Examiner* — Justin Seabe
(74) *Attorney, Agent, or Firm* — Oliff PLC

(57) ABSTRACT

A sealing element for positioning radially outwardly of aerofoil blades of a gas turbine engine is provided. A radially inner surface region of the sealing element includes a seal structure having one or more inwardly projecting walls formed by additive layer, powder fed, laser weld deposition. The walls form a plurality of curved profile shapes which are arranged in a repeating pattern across the radially inner surface region. None of the walls intersects with any other wall. The curved profile shapes have no radii of curvature less than 0.5 mm.

14 Claims, 4 Drawing Sheets

(52) U.S. Cl.
CPC .... *F05D 2230/234* (2013.01); *F05D 2230/30* (2013.01); *F05D 2240/55* (2013.01)

(56) References Cited

U.S. PATENT DOCUMENTS

| | | | |
|---|---|---|---|
| 7,029,232 B2* | 4/2006 | Tuffs | F01D 11/127 |
| | | | 415/173.1 |
| 9,297,269 B2* | 3/2016 | Morrison | F01D 11/122 |
| 2005/0003172 A1 | 1/2005 | Wheeler et al. | |
| 2006/0110248 A1 | 5/2006 | Nelson et al. | |
| 2008/0206542 A1* | 8/2008 | Vance | F01D 11/122 |
| | | | 428/304.4 |
| 2012/0027573 A1 | 2/2012 | Ali et al. | |

FOREIGN PATENT DOCUMENTS

| | | |
|---|---|---|
| GB | 1 535 663 A | 12/1978 |
| GB | 2 019 263 A | 10/1979 |
| WO | 2014/121060 A1 | 8/2014 |

OTHER PUBLICATIONS

Mar. 4, 2016 Extended Search Report issued in European Patent Application No. 15184777.9

\* cited by examiner

SEALING ELEMENT

FIELD OF THE INVENTION

The present invention relates to sealing element for positioning radially outwardly of aerofoil blades of a gas turbine engine.

BACKGROUND OF THE INVENTION

In gas turbine engines, some of the aerofoil blades and in particular the turbine blades are conventionally surrounded by a sealing structure, which may comprise an annular seal or a seal segment ring made up of a plurality of arc shaped seal segments. Because the turbine blades expand and contract as their temperatures vary in use and centrifugal loads are imposed upon them, it is normal to provide a small gap between the turbine blade tips and the seal, to allow for this fluctuation.

It is known to provide an abradable seal for sealing between the turbine blade tips and the sealing structure. This enables the tips of the turbine blades to wear away the seal to an optimum size and shape without causing damage to the turbine blade tips. Such abradable seals may consist of an open cell foil honeycomb which is brazed in place and subsequently filled with a suitable abradable material, such as a metallic powder. As stated in EP A 1146204 it is also known to directly machine, perhaps by electro discharge machining (EDM), a sealing segment made from an oxidation resistant alloy to form a honeycomb structure that is also filled with a suitable abradable material, such as a metallic powder. In both cases the honeycomb acts as a support for the abradable material. The supporting honeycomb is subsequently partially worn away by the rotating turbine blades, thus forming a seal.

Certain problems are associated with the above seals. The seals may suffer from progressive oxidation attack if the foil material has inadequate oxidation resistance. In addition, problems may be experienced with the brazed joints, and the seals may be difficult to cool.

Additional problems arise when the honeycomb structure has worn and needs to be refurbished. Sealing components produced by vacuum brazing thin foil honeycomb structures to a sealing segment are refurbished by machining away remnants of the worn honeycomb and re attaching a new honeycomb via vacuum brazing. While the brazing quality may be adequate for low temperature applications, at elevated temperatures the brazing will lose its integrity and fail, thereby limiting this technique to low temperature applications.

Where abradable portions have been machined from a solid sealing segment it is required to replace the seal segment in its entirety, thereby adding to the overall cost of the refurbishment process.

EP A 1452696 proposes a different approach in which a radially inner surface region of a sealing element includes a seal structure formed as a plurality of inwardly projecting walls formed by powder fed laser weld deposition. This approach allows cell structures to be produced which are not achievable by other machining methods, such as EDM. Additionally laser welding avoids a need for expensive tooling, permits a larger range of materials to be used for forming the cell structure, and can be used to repair worn seal structures.

SUMMARY OF THE INVENTION

It would be desirable to provide improved sealing elements for use in forming seal segment rings. In particular, it would be desirable to improve the thermal fatigue characteristics of such sealing elements.

Accordingly, in a first aspect, the present invention provides a sealing element for positioning radially outwardly of aerofoil blades of a gas turbine engine, a radially inner surface region of the sealing element including a seal structure having one or more inwardly projecting walls formed by additive layer, powder fed, laser weld deposition, wherein:

the walls form a plurality of curved profile shapes which are arranged in a repeating pattern across the radially inner surface region, none of the walls intersects with any other wall, and the curved profile shapes have no radii of curvature less than 0.5 mm.

By utilising curved profile shapes which are arranged in a repeating pattern across the radially inner surface region, it is possible to efficiently cover the area of the radially inner surface region with stress tolerant, and hence thermal fatigue resistant, sealing walls. Further, by avoiding intersections (i.e. nodes) between walls and ensuring that no curved profile shapes have radii of curvature less than 0.5 mm, stress raisers in the walls can be avoided.

In a second aspect, the present invention provides a seal segment ring for a turbine of a gas turbine engine, wherein the ring includes a plurality of sealing elements according to the first aspect.

In a second aspect, the present invention provides a gas turbine engine having a turbine including the seal segment ring of the second aspect.

In a third aspect, the present invention provides a method of forming a sealing element according to the first aspect, the method including: forming the seal structure at a radially inner surface region of the sealing element by additive layer, powder fed, laser weld deposition.

Optional features of the invention will now be set out. These are applicable singly or in any combination with any aspect of the invention.

The sealing element may comprise or form part of a generally annular housing for surrounding the tips of the blades of a turbine of the engine.

The sealing element may comprise a seal segment.

The walls can project substantially radially inwardly. However, another option is for the walls to project inwardly at an angle of up to about 30 degrees from the radial direction.

The radially inner edges of the walls may define a substantially arc shaped inner face of the sealing element.

The walls may further form one or more straight line boundaries at one or more edges of the radially inner surface region. Such a boundary may, for example, be useful at the trailing edge of the radially inner surface region, in order to retain abradable material which can fill the spaces between the walls.

The walls may be configured such that all the additive layers of each curved profile shape can be formed by moving the laser in a closed-circuit weld deposition path, without any reversal of laser direction, from a weld deposition start point to a weld deposition end point. Instances of stopping and starting of the deposition process can be associated with cracking. However, by moving the laser in a closed-circuit weld deposition path, the number of such instances can reduced.

The curved profile shapes may be lobed shapes. Such shapes can help to ensure that no point on the radially inner surface region of the sealing element is too far from a wall. The lobes of such shapes form successive convexities and concavities along a face of wall. These convexities and concavities may be configured such that they all have the same radii of curvature.

The curved profile shapes may form cells which are open only at their radially inner sides.

The thickness of the walls can reduce towards their radially inner edges. This can improve heat transfer towards the bases of the walls and hence wall cooling. However, the thickness of the walls may increase locally at their radially inner edges. This can help to prevent abradable material, which can fill the spaces between the walls, from becoming detached.

The seal structure may extend over substantially the whole of the radially inner surface region of the sealing element.

The walls may be abradable. The walls may be formed from at least one of a group of materials comprising CM186, Rene 142, Haynes 214 and Amdry 955.

The spaces between the walls may be filled with abradable material. For example, the abradable sealing material may be selected from at least one of a group of materials comprising porous yttrium stabilized zirconia, porous alumina and hollow NiAl powder.

The inwardly projecting walls may have a height of up to about 3 mm.

The inwardly projecting walls may have a width of up to about 0.4 mm.

The inwardly projecting walls may be positioned so that no point on the radially inner surface region of the sealing element is greater than about 1.2 mm from a wall.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
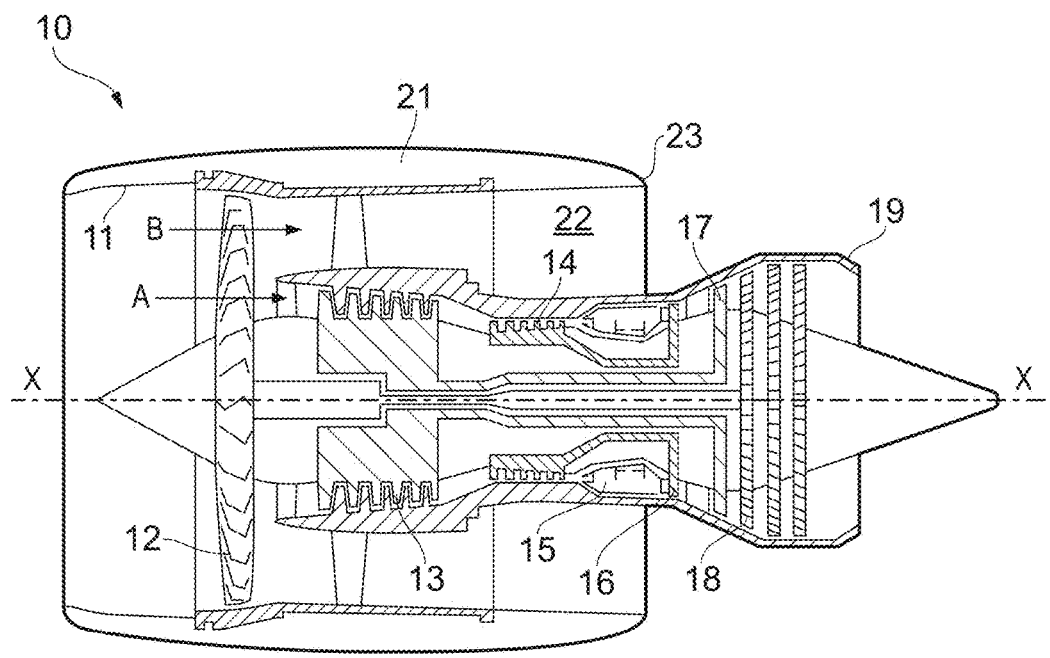
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 2:
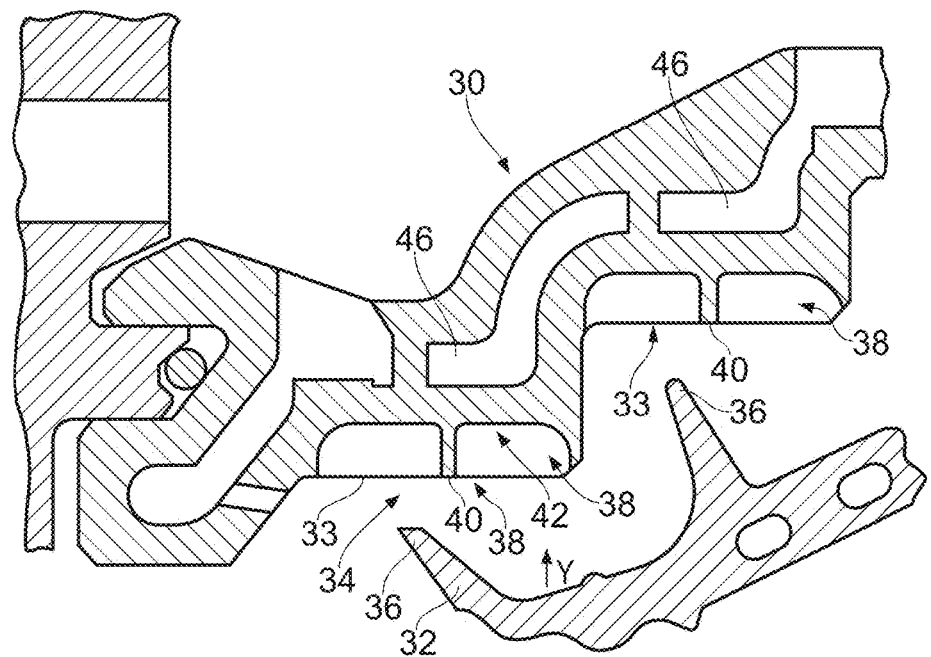
FIG. 2 shows schematically a section through a turbine seal segment.
Figure 3:
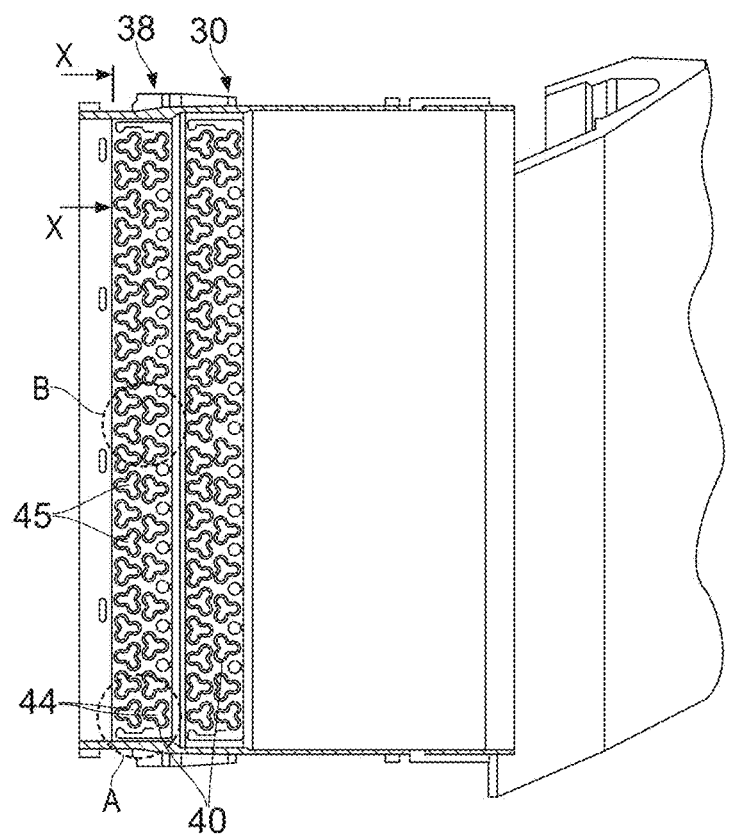
FIG. 3 shows schematically a view in the direction of the arrow Y of FIG. 2.
Figure 4:
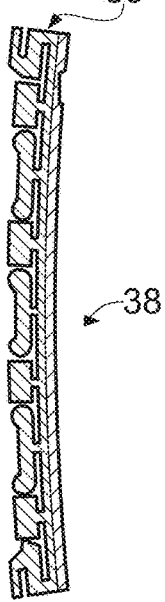
FIG. 4 shows schematically a view on the line X-X of FIG. 3.

FIGS. 2 to 4 illustrates a turbine seal segment 30 for the high pressure turbine 16. A plurality of arc shaped sealing elements in the form of a turbine seal segment together form a substantially cylindrical seal segment ring which encases the rotating high pressure turbine blades 32 (see FIG. 2). A small gap 34 is provided between the tips 36 of the turbine blades 32 and a radially inner surface 33 of the seal segment 30. The size of the gap 34 varies with time for various reasons, including variations in the temperatures of the turbine blades 32 and other components.

Referring to the figures, according to an embodiment of the invention, an open cell structure 38 is formed integrally with the turbine seal segment 30 in the region of its radially inner surface 33. The open cell structure 38 includes upstanding walls 40 which project radially inwardly. The walls 40 form three-lobed, curved profile shapes 44 which are arranged in a repeating pattern across the radially inner surface 33 of the seal segment 30. These shapes define open cells having generally circumferentially extending bases 42. The cells, and the spaces between the cells, are able to receive and support an abradable material 45 such as a metallic powder.

Figure 5:
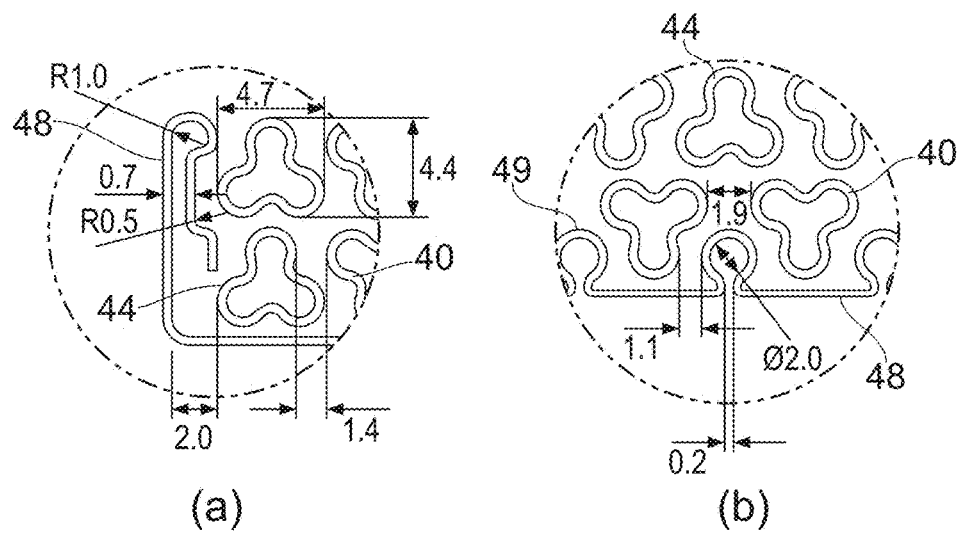
FIG. 5 shows close-up views of (a) the circled region A from FIG. 3, and (b) the circled region B from FIG. 3.

FIG. 5 shows close-up views of (a) the circled region A from FIG. 3, and (b) the circled region B from FIG. 3. In FIG. 5, distances are indicated in mm. None of the walls 40 intersects with any other wall, and the curved profile shapes 44 have no radii of curvature less than 0.5 mm. In constructing the walls 40, particular advantage is found in avoiding wall intersections (i.e. nodes) and small radii of curvature in the profile shapes, as both can act as stress raisers promoting thermal fatigue.

Each of the lobed structures defines a cell that is open at the radially inner surface of the seal segment.

As well as the curved profile shapes 44, the walls 40 form straight line boundaries 48 at the trailing edge and side edges of the radially inner surface 33. These boundaries 48 help to retain the abradable material 45 in the spaces between the cells against the action of the blade tips 36. The walls also form spaced, circular salients 49 at the trailing edge which prevent any areas of the radially inner surface 33 being too far from a wall 40. None of the salients 49 have radii of curvature less than 0.5 mm.

The walls 40 may project up to about 3 mm radially inwardly from the surface 42. The walls 40 have a width of about 0.2 mm to 0.4 mm and the generally parallel walls are positioned a maximum spacing of about 1.9 apart.

Cooling channels 46 are provided within the seal segment 30, radially outwardly of the cell structure 38. Air flowing through the cooling channels helps to cool the cell structure 38 and any abradable material 45 located therein.

The open cell structure 38 is formed by laser weld deposition. The weld alloy chosen need not be made from the same material as the seal segment 30. In fact there may be advantages in choosing a different material. The use of a highly oxidation resistant material to form the cell structure 38 obviates the needs to form the segment 30 from such a material.

Figure 6:
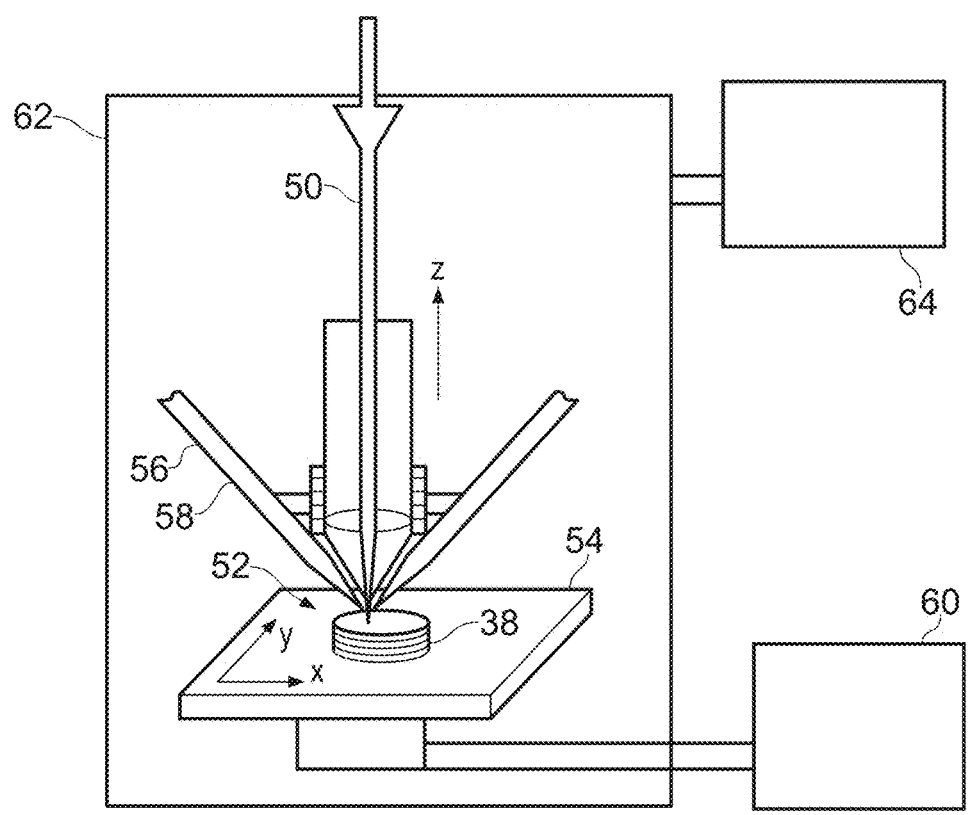
FIG. 6 shows schematically a laser welding apparatus.

Referring now to FIG. 6, a laser 50 is provided and focused down to provide the required energy density at a working region 52 on the substrate 54. Powder 56 is supplied via powder feed tubes 58 to the working region 52. The laser 50 and the powder feed tubes 58 are all held static. The position and movement of the substrate is controlled by a computer control system 60. The focused laser melts the powder 56 and the substrate 54 which mix and solidify when the laser 50 moves to a new position. In order to build up the structure 38 the laser may need to pass over the same region a number of times. Each pass puts down approximately 0.5 mm. However, preferably, the walls 40 are configured such that all the additive layers of each curved profile shape 44 can be formed by moving the laser in a closed-circuit weld deposition path, without any reversal of laser direction, from a weld deposition start point to a weld deposition end point. In particular, each three-lobed, curved profile shape 44 can be formed by simply moving the laser continuously and repeatedly in one circulation direction around the given shape, which thus has one start point and one end point. Reducing the number of start and end points can reduce instances of cracking in the walls The laser welding equipment and working region 52 are enclosed in a sealed compartment 62 or "glove box" in which the oxygen and moisture level is controlled by a gas purifier 64. This provides a controlled atmosphere, thereby preventing contamination of the weld pool.

Although it will be appreciated that any suitable combination of equipment may be employed, it has been found that $CO_2$ laser of type TR1750/380 (Wegmann-Baasel Laser GmbH) used in conjunction with a Sulzer Metco type 9MPE powder feed unit, an X-Y table and Z-axis motor, and a CNC control unit produce the required results.

The following operational parameters have been found to produce satisfactory results:
  laser power: between 144 to 432 W
  laser scanning speed: between 200 to 400 mm/min
  powder feed rate: between 8 to 20 g/min
  powder carrier gas: argon
  carrier gas flow rate: 12 l/min The laser 50 is operated in pulse mode, the pulse frequency being set at 1 kHz. The peak and trough of the pulse is set to 100% and 0% of the setting power respectively. In order to obtain the desired small focal spot of the laser beam, it may be required to position a beam expander (not shown) above the focal lens.

Particular benefit can be found in employing four powder feed tubes 58. The four tubes can be arranged symmetrically and equi-spaced around the laser beam 50, with the angle between each of the tubes 58 and the laser 50 set to 30°.

It will be appreciated that the above are cited only as examples and that satisfactory results may be achieved with equipment having a different specification and configuration.

Prior to deposition the surface of the substrate 54 is scanned with the laser 50 along the paths where the walls 40 are to be built. This action cleans off any contaminants such as oxide film from the surface of the substrate 54, thereby improving the bond between the substrate 54 and the walls 40.

It is of particular benefit to use a relatively high laser power setting for the cleaning scan and for the first few welding passes than for subsequent welding passes. Doing so heats up the substrate 54, thereby improving the bond between the substrate 54 and the structure 38.

The substrate 54 can be selected from at least one of a group of materials comprising nickel based superalloys, CMSX-4, MM002, C1023 and IN713LC.

The powder 56 can be selected from at least one of a group of materials comprising CM186, Rene 142, Haynes 214 and Amdry 955. The powder size used may be in the range of 50 μm to 100 μm, although it will be appreciated that other powder sizes may prove to have equal utility.

After the cell structure 38 has been formed it may need to be machined to achieve the desired profile. The surfaces of the walls 44 may be nickel plated, and the walls 44 may subsequently be filled with an abradable material 45. Alternatively, the cells may be overfilled, such that the abradable material 45 projects radially inwardly beyond the radially inner edges of the walls 40. In this case, the open cell structure 38 acts as a retention system for the abradable material 45, thus minimising damage to the walls 40.

The abradable material 45 may be selected from at least one of a group of materials comprising porous YSZ, porous alumina and hollow NiAl powder.

The above described embodiment thus provides a turbine seal segment in which there is no brazed joint between the open cell structure 38 and the remainder of the seal segment 30 and thus no possibility of the open cell structure 38 becoming detached from the substrate 54. The described embodiment also provides a means for adding material to the seal segment 30.

The walls of the open cell structure 38 have a relatively high oxidation resistance and are easily cooled because they are positioned near to the cooling channels 46.

In use the blade tips of the high pressure turbine blades 32 wear away the abradable material 45 and the walls 40.

Figure 7A:
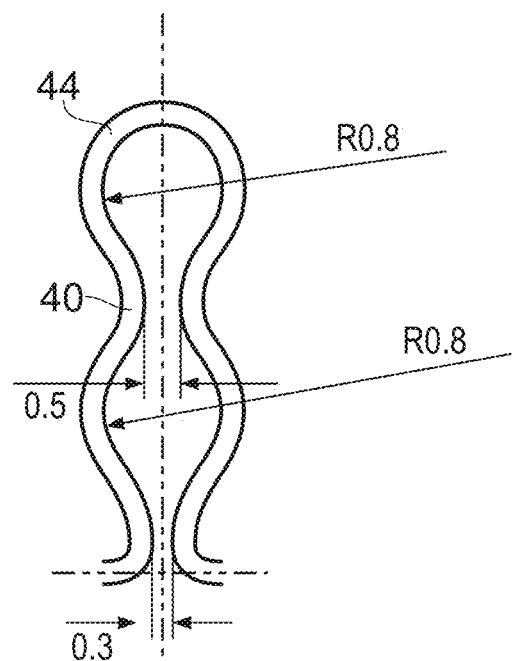
FIGS. 7A and 7B show (a) one curved profile wall shape, and (b) a part of a repeating pattern of such shapes.
Figure 7B:
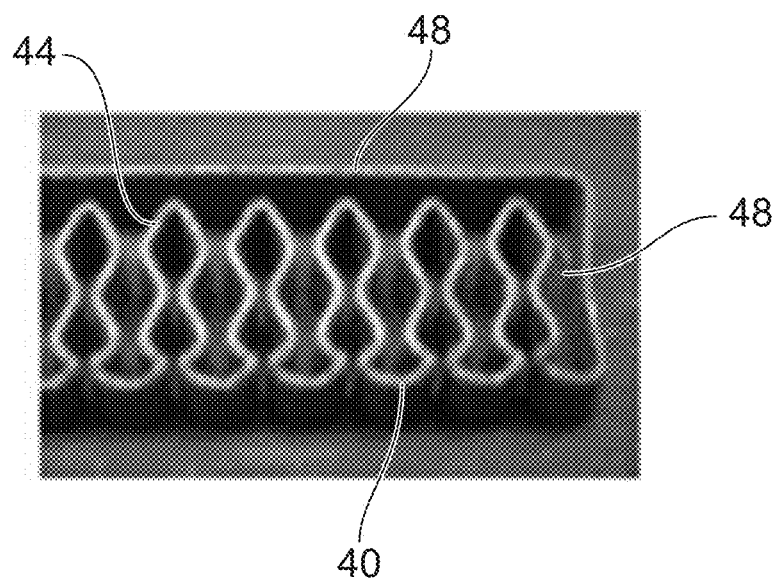

In an alternative embodiment of the invention, the repeating pattern of curved profile shapes 44 across the radially inner surface 33 is formed by a single continuous wall 40, which also forms the straight line boundaries 48 at the trailing edge and side edges of the radially inner surface 33. FIGS. 7A and 7B show (a) just one of the shapes 44 of the alternative embodiment with distances are indicated in mm, and (b) a part of the repeating pattern of the alternative embodiment for use at one side of the radially inner surface 33. Advantageously, the entire pattern of curved profile shapes 44 and the straight line boundaries 48 can be formed by moving the laser in a closed-circuit weld deposition path with just one start point and one end point.

The wall exits the boundary at a first point into a central region following a series of convex and concave arcs before returning to the boundary at a second point that is adjacent to the first point. A narrow gap, typically less than 0.5 mm, and preferably around 0.3 mm is provided between the wall where it leaves the boundary and the wall where it returns to the boundary.

At the point furthest from the exit and return points the wall has a region of one or more convex arcs that extend along an angle that is sufficient to return the wall to the boundary such that the continuous wall has an exit side and return side that together define a cell which may be filled with an abradable material. The cell has one or more local narrowings and one or more local widenings that help to secure the abradable material with the seal segment.

Various modifications may be made to the above described embodiments without departing from the scope of the invention. The section of the walls illustrated is generally rectangular. However, an "Eiffel tower" section may be used, to improve cooling. In this variant, the width of the walls 40 is increased towards their bases, thus providing improved transfer of heat to the cooling channels 46.

The width of the walls 40 may, however, be somewhat increased at their radially inner edges, thus helping to prevent abradable material 45 from becoming detached from the cell structure.

The seal structure 38 may form the seal with no additional sealing material being used. The weld alloy, and consequently the cell walls 40, may be utilised as an abradable.

Subsequent to deposition, electro-chemical machining or etching may be used to reduce the thickness of the walls 40 in the sealing structure 38.

It will be appreciated that the method of producing the projecting walls 40 can also be employed to restore or refurbish thin wall abradable grids that have deteriorated in service While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An abradable sealing element for positioning radially outwardly of aerofoil blades of a gas turbine engine, a radially inner surface region of the sealing element comprising a seal structure having one or more inwardly projecting walls formed by additive layer, powder fed, laser weld deposition, wherein:
   a first group of the inwardly projecting walls defines a continuous border of at least one cell open at a radially inner side of the sealing element, each cell having a plurality of curved portions that form a plurality of curved profile shapes, which are arranged in a repeating pattern across the radially inner surface region,
   none of the walls intersects with any other wall,
   the curved profile shapes have radii of curvature that change between adjacent ones of the curved portions, and
   the curved profile shapes have no radii of curvature less than 0.5 mm.

2. An abradable sealing element according to claim 1, wherein a second group of the inwardly projecting walls forms one or more straight line boundaries at one or more edges of the radially inner surface region.

3. A sealing element according to claim 1, wherein the first group of inwardly projecting walls are configured such that all the additive layers of each curved profile shape can be formed by moving the laser in a closed-circuit weld deposition path, without any reversal of laser direction, from a weld deposition start point to a weld deposition end point.

4. A sealing element according to claim 1, wherein the curved profile shapes are lobed shapes.

5. A sealing element according to claim 1, wherein the cells are bounded solely by the first group of inwardly projecting walls and the radially inner surface of the sealing element.

6. A sealing element according to claim 1, wherein the thickness of the first group and second group of inwardly projecting walls reduces towards their radially inner edges.

7. A sealing element according to claim 1, wherein the seal structure extends over substantially the whole of the radially inner surface region of the sealing element.

8. A sealing element according to claim 1, wherein each of the at least one cells is filled with abradable material.

9. A seal segment ring for a turbine of a gas turbine engine, wherein the ring includes a plurality of sealing elements according to claim 1.

10. A gas turbine engine having a turbine including the seal segment ring of claim 9.

11. An abradable sealing element for positioning radially outwardly of aerofoil blades of a gas turbine engine, a radially inner surface region of the sealing element comprising a seal structure having an inwardly projecting wall formed by additive layer, powder fed, laser weld deposition, wherein:
   the inwardly projecting wall extends continuously from a straight line boundary into a central region of the sealing element, around a plurality of concave and convex arcs, which are arranged in a repeating pattern across the radially inner surface region, and returns to the straight line boundary, the sum of the lengths of the concave arcs being greater than the sum of the length of the convex arcs.

12. A sealing element according to claim 11, wherein the inwardly projecting wall returns to the straight line boundary adjacent to the point at which the wall leaves the boundary.

13. A method of forming a sealing element according to claim 1, the method comprising:
   forming the seal structure at a radially inner surface region of the sealing element by additive layer, powder fed, laser weld deposition.

14. A method according to claim 13, wherein all the additive layers of each curved profile shape are formed by moving the laser in a closed-circuit weld deposition path, without any reversal of laser direction, from a weld deposition start point to a weld deposition end point.

* * * * *